Aug. 18, 1964 R. G. PAGE 3,144,715
BUTTER PAT DISPENSERS
Filed April 9, 1963 5 Sheets-Sheet 1

Inventor:
Ralph G. Page,
by Robert T. Palmer
Attorney

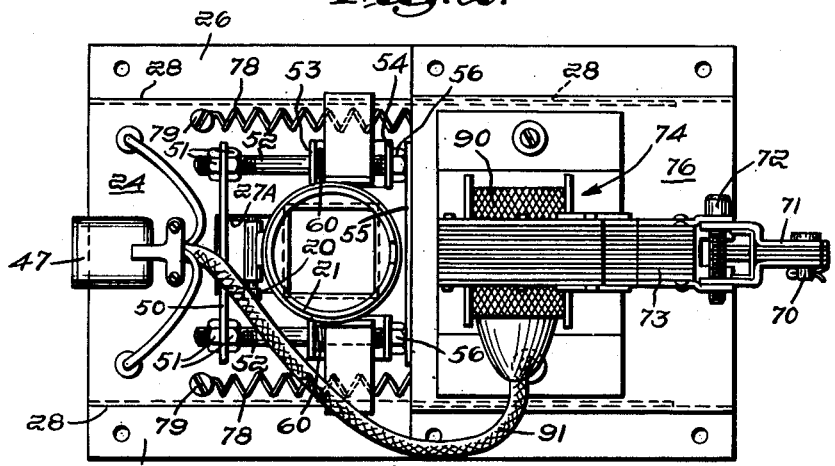

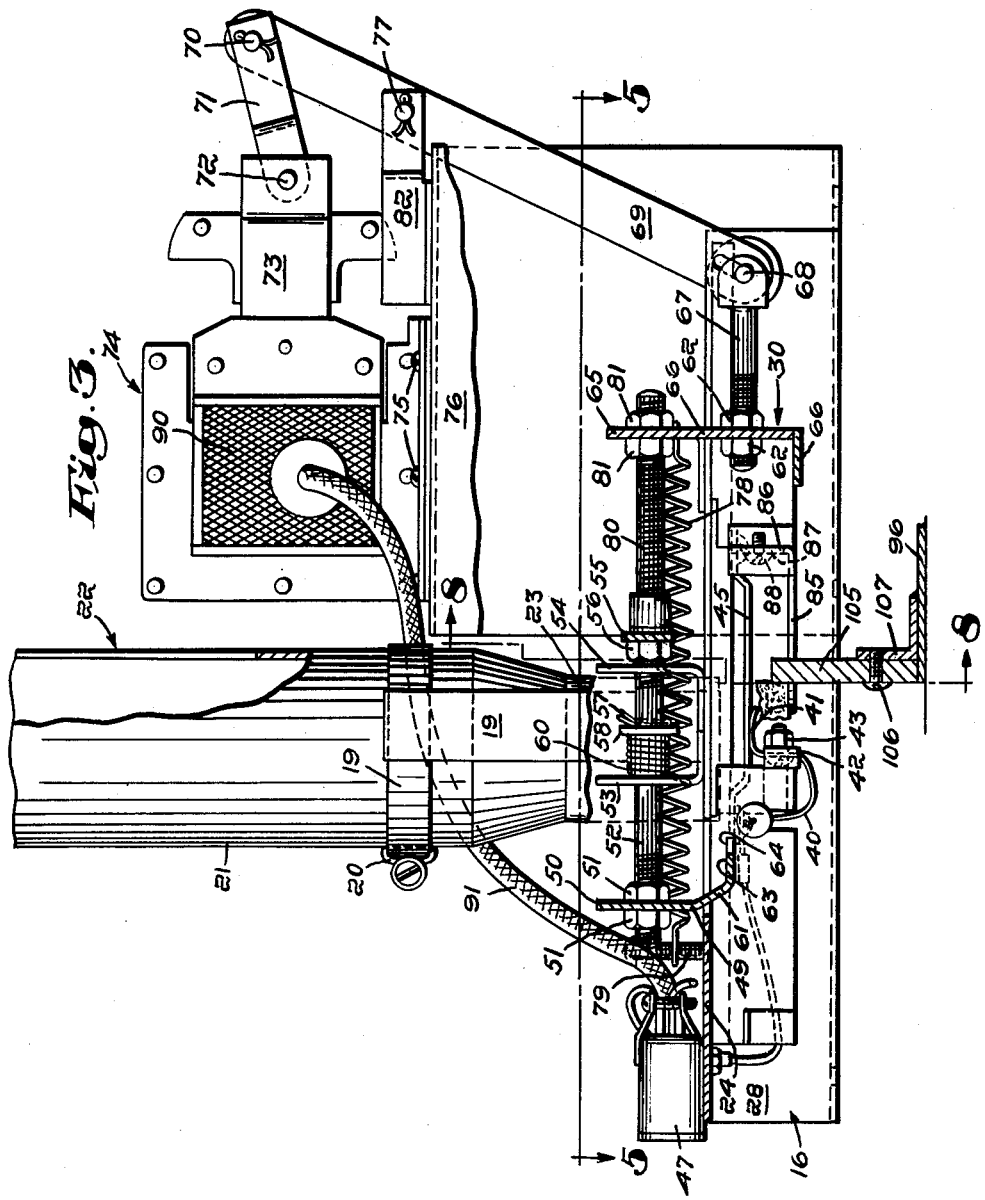

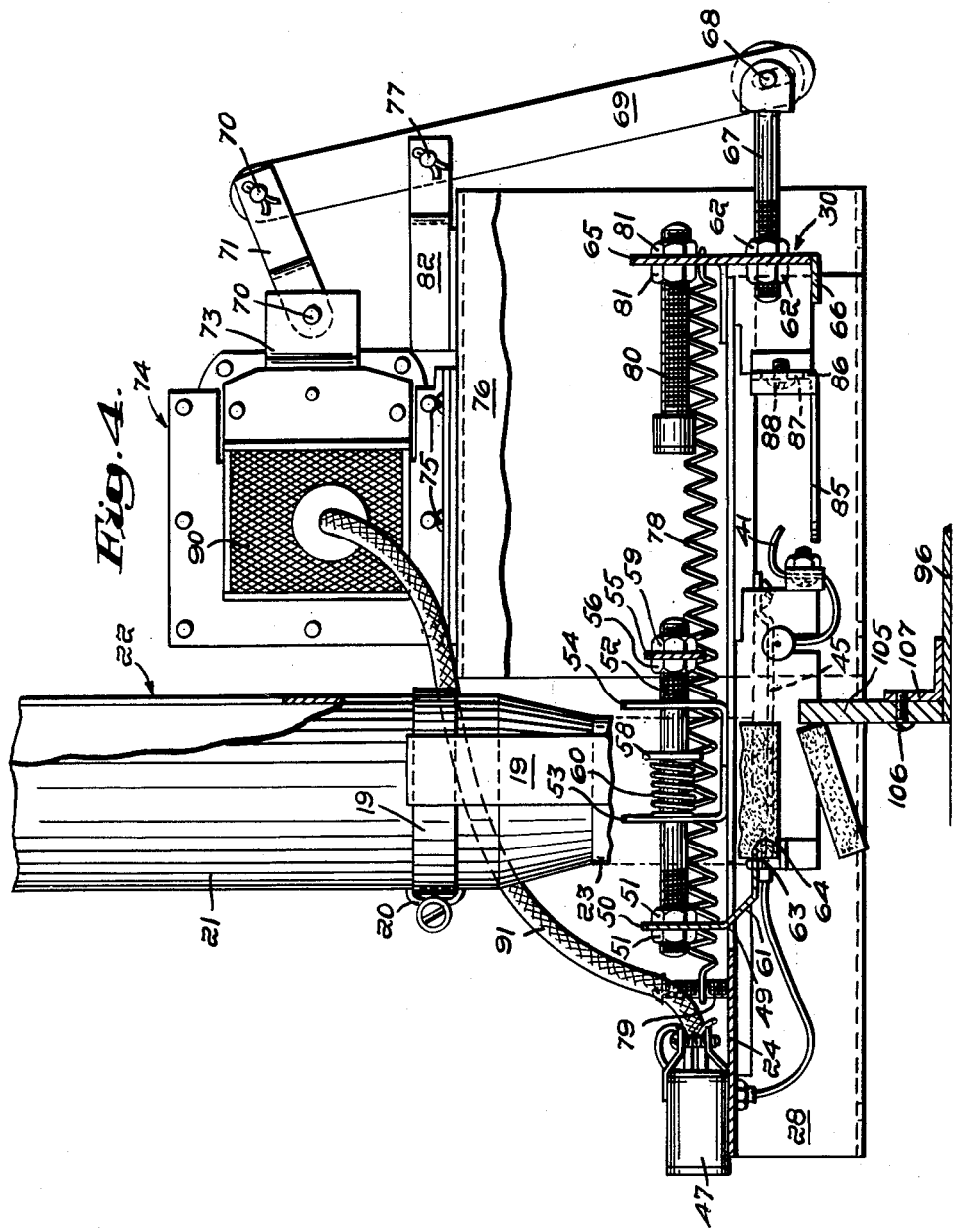

Inventor:
Ralph G. Page,
by Robert J. Palmer
Attorney

United States Patent Office 3,144,715
Patented Aug. 18, 1964

3,144,715
BUTTER PAT DISPENSERS
Ralph G. Page, Peabody, Mass.
Filed Apr. 9, 1963, Ser. No. 271,616
12 Claims. (Cl. 31—21)

This invention relates to butter dispensers in which pats of butter are severed from columns of butter, and dropped upon plates as required.

There have been many proposals for butter dispensers for use in restaurants, and in hotel and other large dining roms, which can sever pats of butter and deposit them upon plates following the actuation of a lever or switch. Due, however, to the softness and stickyness of butter, there has been no commercially acceptable butter dispenser prior to this invention, although there have been many attempts to develop such a dispenser. Accordingly, it is the general practice to slice butter pats from butter columns at remote locations, and where the pats are to be picked up by users as in cafeterias, the pats are stored on so-called "patty trays" of cardboard, the cost of the latter, and the cost of the labor associated therewith, adding to the cost of the supplied butter pats.

This invention provides a butter dispenser within a refrigerated cabinet. Rectangular blocks of butter are stacked in a vertically extending tube with the rear portion of the bottom of the lowest block supported upon a pair of sppaced-apart straps which are attached to a horizontally slidable, slide assembly. Extending cross-wise of, and insulatedly attached to the slide assembly in front of and spaced above the butter supporting straps, is a bare, electrically heated wire of small diameter. Attached to the frame of the dispenser in front of and spaced above the wire is a spring urged butter retainer having a serrated rear edge parallel to the wire. A solenoid is connected by linkage to the slide assembly. A switch is located below the front portion of the slide assembly and is adapted to be closed by being pushed by a butter receiving plate. When the switch is closed, the solenoid is energized and moves the slide assembly rearwardly, pulling the heated wire through the butter column and severing a pat. The butter retainer, at this time, pushes its serrated edge a slight distance into the butter column and prevents the latter from being lowered by the removal of the supporting straps from under its bottom which occurs as the wire is pulled through the butter column. The removal of the straps from under the butter column permits the severed butter pat to fall onto the plate which has closed the switch. A butter pat stop extends upwardly between the straps near the back edge of the butter column, and prevents the severed pat from being moved backwardly by the wire as it is severed. When the plate after receiving the butter pat is moved away from the switch, the latter opens and deenergizes the solenoid, permitting springs attached to the slide assembly to move the latter forwardly to its normal position. During this movement, the butter column supporting straps are moved under the rear portion of the column, and the butter retainer is moved forwardly to remove its serrated edge from its penetration into the butter column, permitting the butter column to fall upon the supporting straps ready for the next severing operation.

An object of this invention is to improve butter dispensers.

Another object of this invention is to provide an effective, trouble-free butter dispenser.

Other objects of this invention are to simplify and reduce the cost of butter dispensers.

This invention will now be described with reference to the annexed drawings, of which:

FIG. 2 is an enlarged plan view looking down on the butter dispensing mechanism;

FIG. 3 is an enlarged side view, partially in section, of the lower portion of the dispensing mechanism with its slide assembly in its normal, forward position, and shows a portion of a butter column seated on the butter supporting straps of the slide assembly;

FIG. 4 is a view corresponding to FIG. 3, but showing the slide assembly in its rearward position, and shows a severed butter pat falling from the dispenser;

FIG. 5 is a section along the lines 5—5 of FIG. 3;

FIG. 6 is a plan view looking up at the bottom of the dispenser showing the slide assembly in its forward position;

Figure 1:
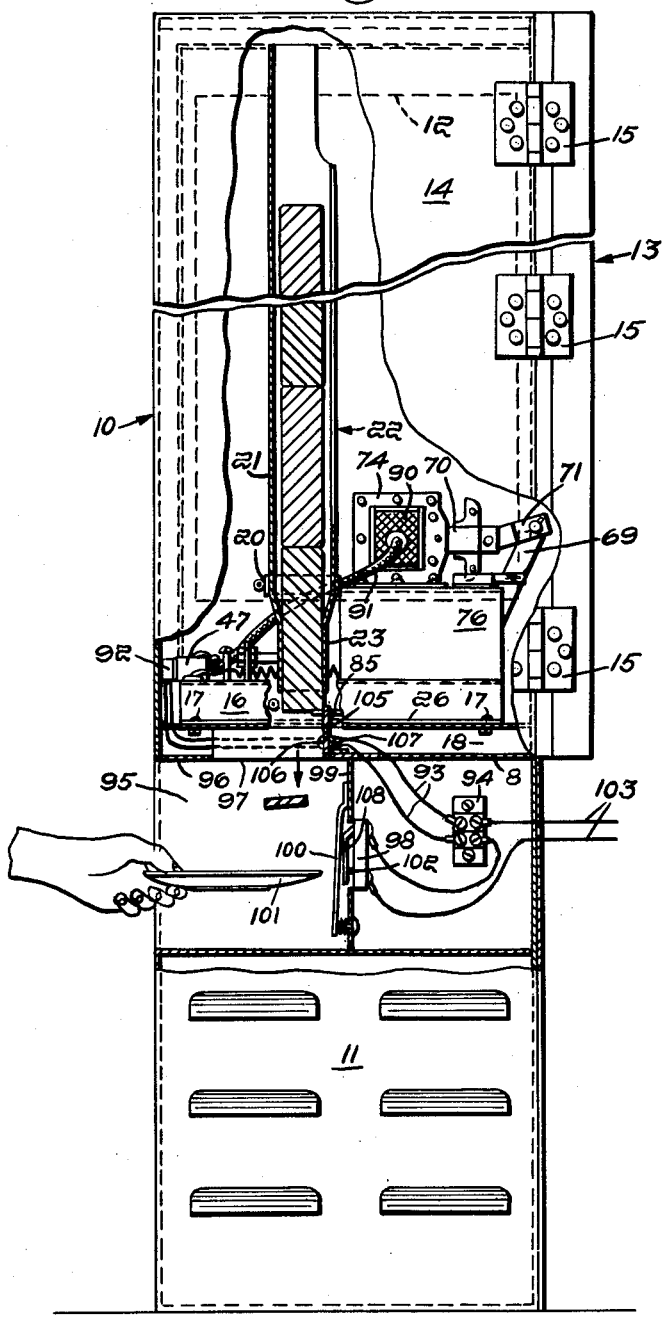
FIG. 1 is a side view, with a portion of the adjacent wall removed, and a portion in section, of a refrigerated cabinet containing a butter dispensing mechanism embodying this invention.
Figure 7:
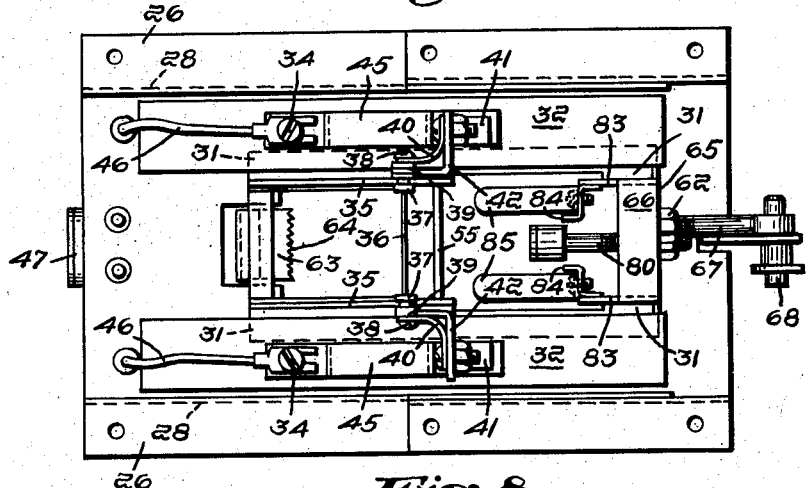
FIG. 7 is a view corresponding to FIG. 6, but showing the slide assembly in its rearward position.
Figure 8:
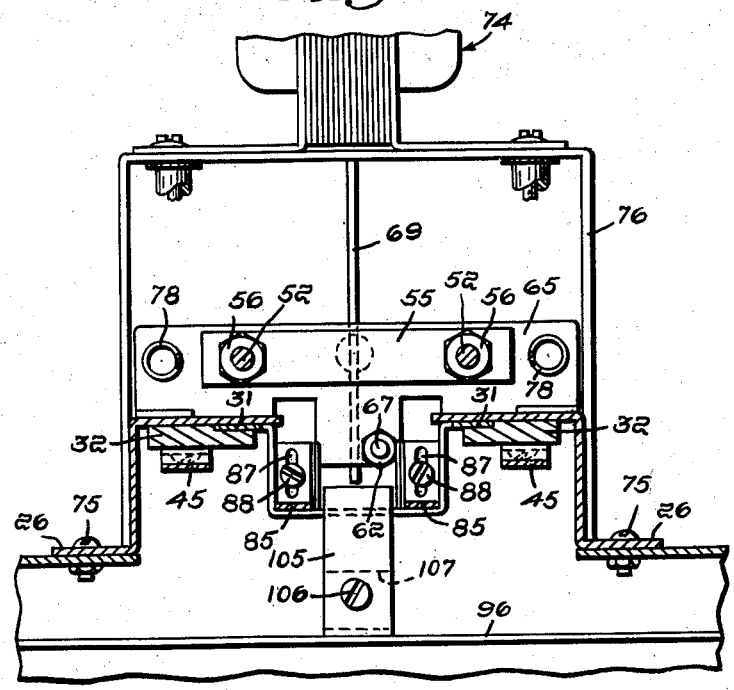
FIG. 8 is a section along the lines 8—8 of FIG. 3.

Referring first to FIG. 1, a cabinet 10 has a lower compartment 11 containing a refrigeration system which is not shown, and which is connected to cold plates 12 which are enclosed within an upper refrigerated compartment 13 having an access door 14 supported by hinges 15.

The dispensing mechanism consists of a frame 16 in the form of a channel having horizontally extending outer portions 28 which are attached by screws 17 to a transverse wall 18 of the cabinet between its upper and lower compartments. The frame has vertical side walls 28 to which the lower ends of straps 19 are attached. The upper ends of the straps are attached to a clamp 20 which extends around a cylindrical upper portion 21 of a transparent, plastic tube 22 which has a rectangular lower portion 23, the latter being shaped to extend closely around a conventional quarter-pound butter block. FIG. 1 shows several of such blocks stacked within the tube 22.

Top 24 of the frame 16 has a relatively wide slot 25 extending from its rear end (right end of FIG. 5) to a point just to the rear of the bottom of the tube 25, and which connects at its front end with a relatively narrow slot 27 which connects at its front end with a still narrower slot 27A. A slide assembly 30 has flanged portions forming slides 31, the tops of which are in slidable contact with the bottom of the frame top 24 along opposite sides of the slots 25, 27 and 27A, and the bottoms of which are in slidable contact with plastic plates 32 which are attached to the frame top 24 by screws 33 and 34. The slide assembly 30 has vertically extending side walls 35 on opposite sides of the slot 27A and the front portion of the slot 27. A small diameter wire 36 extends transverse the space between the walls 35, and its ends extend through insulators 37 supported in openings in the walls 35, and are attached to the inner ends of screws 38 threaded into nuts 39. The screws 38 are connected by wires 40 to brushes 41 of metal ribbon which are insulatedly attached to brackets 42 by plastic screws 43 and plastic nuts 44. The brushes 41 are in slidable contact with metal strips 45 which are attached by the screws 33 and 34 to the frame top 24. The brackets 42 are attached to the walls 35. The straps 45 are connected by wires 46 to a socket 47.

A transversely extending plate 50 has a portion extending above the frame top 24 and attached by nuts 51 to the forward ends of threaded rods 52 which extend through circular holes in spaced-apart, vertically extending portions 53 and 54 of angles attached to the frame top 24. The rear ends of rods 52 extend through and are attached to a cross-plate 55 by nuts 56 and 59 threaded on the rods 52. Attached by cotter pins 57 and discs 58 to the rods 52 between the angle portions 53 and 54 are the rear ends of springs 60 coiled around the rods 52, the front ends of these springs being attached to the front angle portions 53. The plate 50 has a lower portion 61 which extends downwardly and rearwardly in the slot 27A substantially the full width thereof. The lower plate portion 61 has a horizontally extending rear portion 63 with a serrated rear edge 64. The plate portion 63 is spaced slightly above the level of the wire 36. The bottom of the tube 22 extends through the slot 27 to slightly above the level of the plate portion 63.

The frame 30 has a vertically extending rear end portion 65 with a transversely extending portion 66 thereunder, and attached to the portion 65 by nuts 62 is the threaded front end of a rod 67, the rear end of which is connected by a pin 68 to the bottom of a link 69. The top of the link 69 is connected by a pin 70 to the rear end of link 71 which is attached by a pin 72 to plunger 73 of a solenoid 74. The solenoid 74 is attached by screws 75 to the top of an inverted U-shaped channel member 76, the sides of which are attached to the sides of the frame 30. The channel member 76 extends over the rear portion of the slide assembly 30 and is spaced therefrom. The link 69 is pivoted on a pin 77 which extends through a bracket 82 attached to the top of the member 76.

Coiled springs 78 have their front ends attached by screws 79 to the top 24 of the frame, and have their rear ends secured within holes in the frame portion 65. A rod 80 has a rear end attached by nuts 81 to the frame portion 65, and its front end is normally in contact with the rear side of the cross plate 55. The frame has rear, vertically extending, side walls 83 extending forwardly of the frame portion 66, and to which are attached rear portions of angles 84. Horizontally-extending, spaced-apart, butter column supporting straps 85 have vertically extending rear portions 86 with vertically extending slots 87 therein. Screws 88 extending within the slots 87 attach the straps 85 to the angles 84. The slots 87 permit the straps 85 to be raised or lowered for providing butter pats of different thicknesses. The straps 85 are so located that their front end portions extend under and support the rear portion of the lowermost block of butter within the tube 22 as shown by FIGS. 1 and 3.

The solenoid 74 has an energizing coil 90 connected by wires 91 to the socket 47. As shown by FIG. 1, a plug 92 in the socket 47 is connected by wires 93 to a terminal block 94.

There is a recess 95, rectangular in section, in the front portion of the cabinet 10 between its lower portion 11 and a transverse wall 96 below the slide assembly. The wall 96 has an opening 97 below the lower end of the tube 22 for permitting a severed pat of butter to fall into the recess 95. A conventional switch 98 is mounted on a vertically etxending wall 99 forming the rear wall of the recess 95, and has a plunger arm 100 and another plunger arm 108 adapted to be moved rearwardly by a plate 101 inserted within the recess 95 against a plunger 102 that closes the switch. The latter is connected in series with electric supply lines 103 and the wires 93 so that electric power is applied to the wire 36 for heating it, and to the solenoid 74 for energizing it when the switch is closed.

A butter pat stop 105 of plastic is attached by a screw 106 to an angle 107 which is attached to the top of the wall 96, and extends vertically between the butter supporting straps 85 slightly to the rear of the rear edge of the bottom of the lowermost butter block within the tube 22, and to a level just below the level of the butter pat severing wire 36.

Operation

Normally, the bottom of the lowermost block of butter within the tube 22 is supported on the straps 85; the switch 98 is open; the wire 36 is unheated; the solenoid 74 is deenergized, and the slide assembly 30 is in its forward position, with the butter pat severing wire 36 and the serrated edge 64 of the plate 61 slightly in front of the space directly below the bottom of the tube 22. The springs 60 urge the plate 50 and the serrated edge 64 of its lower portion 61 rearwardly, but they cannot move rearwardly because of the contact of the front end of the rod 80 with the cross-plate 55.

When a person desires a pat of butter, he or she moves a plate 101 into the recess 95 against the switch arm 100 of the switch 98, closing the switch, and energizing the wire 36 and the solenoid 74. The latter through its plunger 73 and links 71 and 69, and the rod 67, moves the slide assembly 30 rearwardly, moving the front end of the rod 80 from against the cross-plate 55, and permitting the springs 60 to move the serrated edge 64 rearwardly to slightly penetrate the lowermost block of butter. Next, the butter supporting straps 85 are moved rearwardly from under the bottom of the lowermost block of butter, with the serrated edge 64 of the plate portion 61 now supporting the butter column, and the heated wire 36 is drawn through the lowermost butter block, severing a pat of butter which falls through the opening 97 in the wall 96 onto the plate 101. The butter pat stop 105 prevents the severed pat from being deflected rearwardly by the rearward movement of the wire 36. The wire 36 continues to be heated during its movement through the butter by the contact of its brushes 41 with the current carrying straps 45. After the pat is severed, the brushes 41 run off the straps 45, and the wire 36 is deenergized.

The springs 78 are stretched by the rearward movement of the slide assembly, and when the plate 101 is moved away from the switch 98, and the solenoid 74 is deenergized, the springs 78 return the slide assembly to its forward position, moving first, the wire 36 and the butter supporting straps 85 to their forward positions with the straps 85 under the bottom of the butter block from which the pat has been severed, following which the front end of the rod 80 is moved forwardly against the cross-plate 55, and moves through the latter and the rods 52, the plate portion 61 with its serrated edge 64 forwardly, withdrawing the edge 64 from the lowermost butter block, and permitting the latter to drop upon the supporting straps 85. The mechanism is now ready for the next butter pat severing operation.

Usually, depending upon how quickly the plate 101 is removed from against the switch 98, the forward movement of the straps 85 causes the front ends of the latter to strike the falling, severed butter pat, moving it forwardly over the center of the plate 101.

What is claimed is:

1. A butter pat dispenser comprising a vertically extending tube for receiving a column of butter, a frame supporting said tube and having an opening into which the bottom of said tube extends, a slide assembly slidably supported by said frame for movement under said tube bottom, means attached to said assembly at one side of said tube bottom and normally located under said bottom for supporting the bottom of a column of butter in said tube, a bare wire insulatedly attached to said assembly below the level of said tube bottom and above the level of said supporting means and extending perpendicular to the direction of movement of said assembly and located normally at the opposite side of said tube bottom, auxiliary butter column supporting means slidably supported by said frame and having a butter penetrating edge generally parallel to said wire below the level of said tube bottom and above the level of said wire and located normally at said opposite side, a solenoid attached to said frame and having means including a plunger so attached to said assembly that when energized said solenoid moves through said last mentioned means said assembly in a direction to move said first mentioned supporting means from under said tube bottom, and to move said wire across the space under said tube bottom, means including said assembly for causing said auxiliary means and said edge to move in said last mentioned direction when said assembly starts to move in said last mentioned direction, means for supplying electric current to energize said solenoid and to heat said wire, and means for moving said assembly in a direction opposite to said last mentioned direction when said solenoid is deenergized.

2. A dispenser as claimed in claim 1 in which said first mentioned supporting means comprises a pair of spaced-apart members, and in which there is provided a fixed butter pat stop member extending between said members at said one side of said tube bottom to a level below the level of said wire.

3. A dispenser as claimed in claim 2 in which adjustable means is provided for raising and lowering said members of said pair.

4. A dispenser as claimed in claim 1 in which adjustable means is provided for raising and lowering said first mentioned supporting means.

5. A butter pat dispenser comprising a refrigerated compartment, a frame supported within said compartment at its bottom, a tube for containing a butter column supported by said frame and extending vertically within said compartment above said frame, said frame and compartment bottom having spaced-apart, vertically aligned openings, the bottom of said tube extending through said opening in said frame into the space between said openings, a slide assembly slidably supported by said frame for movement in said space, means attached to said assembly at one side of said tube bottom and normally located under said tube bottom for supporting the bottom of a butter column in said tube, a bare wire insulatedly attached to said assembly and extending transverse said space below the level of said tube bottom and above the level of said supporting means and normally located at the opposite side of said tube bottom, auxiliary butter column supporting means slidably supported by said frame and having a butter penetrating edge parallel to said wire below the level of said tube bottom and above the level of said wire and normally at said opposite side of said tube bottom, spring means urging said auxiliary means and said edge towards said one side of said tube bottom, means attached to said assembly and normally in contact with said auxiliary means for preventing movement of said auxiliary means and said edge, a solenoid attached to said frame and having a plunger so connected to said assembly that when said solenoid is energized said plunger moves said assembly in a direction to remove said means normally in contact with said auxiliary means from contact with said auxiliary means, to move said first mentioned supporting means from under said tube bottom, and to move said wire across the space below said sides of said tube bottom, an electric switch below said compartment and located to be closed by a butter pat receiving plate placed under said opening in said compartment bottom, means including said switch when closed for supplying electric current to energize said solenoid and to heat said wire, and spring means for moving said assembly in the opposite direction when said switch is open and said solenoid is deenergized.

6. A dispenser as claimed in claim 5 in which said first mentioned supporting means comprises a pair of spaced-apart members, and in which there is provided a fixed butter pat stop member extending between said members of said pair at said one side of said tube bottom to a level below the level of said wire.

7. A dispenser as claimed in claim 6 in which adjustable means is provided for raising and lowering said members of said pair.

8. A disperser as claimed in claim 5 in which adjustable means is provided for raising and lowering said first mentioned supporting means.

9. A butter pat disperser comprising a vertically extending tube for containing a butter column, a frame supporting said tube and having an opening through which the bottom of said tube extends, a slide assembly slidably supported by said frame for movement under said opening, means attached to said assembly at one side of said bottom and normally located under said bottom for supporting the bottom of a butter column in said tube, a bare wire insulatedly attached to said assembly below the level of said tube bottom and above the level of said supporting means and extending perpendicular to the direction of movement of said assembly and normally located at the opposite side of said tube bottom, auxiliary butter column supporting means slidably supported by said frame and having a butter penetrating edge parallel to said wire below the level of said tube bottom and above the level of said wire and normally located at said opposite side, a solenoid having a plunger so connected to said assembly that when energized said solenoid moves said plunger to move said assembly in a direction to move said first mentioned supporting means from under said tube bottom, and to move said wire past the space under said tube bottom, means including said assembly for causing said auxiliary means and said edge to move in said direction when said assembly starts to move in said direction, means including an electric switch when closed for supplying electric current to energize said solenoid and to heat said wire, and spring means for moving said assembly in the opposite direction and said auxiliary means and said edge in said opposite direction when said switch is open and said solenoid is deenergized.

10. A dispenser as claimed in claim 9 in which said first mentioned supporting means comprises a pair of spaced-apart members, and in which there is provided a fixed butter pat stop extending between said members at said one side of said tube bottom to a level below said level of said wire.

11. A dispenser as claimed in claim 10 in which adjustable means is provided for raising and lowering said members.

12. A dispenser as claimed in claim 9 in which adjustable means is provided for raising and lowering said first mentioned supporting means.

No references cited.